Patented Aug. 23, 1949

2,479,879

UNITED STATES PATENT OFFICE 2,479,879

PRODUCTION OF NITRILES AND AMINES FROM AMMONIA AND OLEFINS

John W. Teter, Chicago, Ill., assignor to Sinclair Refining Company, New York, N. Y., a corporation of Maine No Drawing. Application August 17, 1946,
Serial No. 691,375

3 Claims. (Cl. 260—465.3)

This invention relates to improvements in the production of nitrogen-containing products, particularly of nitriles but including other nitrogen-containing products, such as amines and pyridines, by the direct catalytic reaction of olefins with ammonia. It includes improvements in the process involving, in particular, the use of a novel catalyst which is particularly effective in promoting the production of the desired nitrogen-containing products while repressing to a substantial extent pyrolytic decomposition reactions of the hydrocarbon.

The process of producing nitrogen-containing products by the catalytic reaction of ammonia with olefins and catalysts useful for that purpose, have been described in my applications Serial No. 464,636, filed November 5, 1942, now U. S. Patent No. 2,381,709; Serial No. 365,561, filed November 13, 1940, now U. S. Patent No. 2,381,470; Serial No. 365,562, filed November 13, 1940, now U. S. Patent No. 2,381,471; Serial No. 365,563, filed November 13, 1940, now U. S. Patent No. 2,392,107; Serial No. 444,094, filed May 22, 1942, now U. S. Patent No. 2,418,562; Serial No. 444,095, filed May 22, 1942, and since abandoned; Serial No. 444,096, filed May 22, 1942, now U. S. Patent No. 2,406,929; and Serial No. 444,097, filed May 22, 1942, now U. S. Patent No. 2,398,899. My application Serial No. 605,832, filed July 18, 1945, and since abandoned, describes catalysts which are particularly effective in promoting the reaction. In these processes, the mixture containing olefin and ammonia is brought into contact with the catalyst at temperatures ranging from about 400° to about 700° F., temperatures of about 640° to 650° F. being particularly useful when the olefin is propylene and somewhat higher temperatures being most effective when the olefin is ethylene. In general, the catalysts which are useful in this procedure include reduced metal oxides deposited on an inert carrier, such as diatomaceous earth, heat treated magnesia, heat treated bentonite, bauxite, titanium dioxide, etc. The easily reduced metals, cobalt, nickel, and iron have been described as most useful with cobalt outstanding. Such catalysts may be promoted by the inclusion therein of other easily reducible metal oxides, such as those of zinc, magnesium, manganese, and mixtures of reduced metal oxides such as mixtures of cobalt and nickel, cobalt and iron, cobalt and manganese, and the like, may be used. What I term Spinel-type catalysts, which are obtained by the reduction of co-precipitates of cobalt with another polyvalent metal such as nickel, zinc, or magnesium, which, with cobalt, when in the form of oxides, form Spinel-type crystal structures, have advantages, because they exhibit activity commensurate with those of cobalt catalysts while costing considerably less.

In general, in such catalysts, it has been regarded as important to keep the content of sodium, sulfate, and chlorine at a minimum, and in my application Serial No. 605,832 I have pointed out that for the effective catalysts of that application, the sodium content should not exceed 1%, the sulfate content should not exceed 0.2%, and the chlorine content should not exceed 0.1%.

I have now made the discovery that sodium, in quantities in excess of 1%, and particularly in excess of about 1.25%, and ranging up to 3%, 4%, and even 5% or somewhat more, has the surprising property of radically promoting the activity of the catalyst containing reduced cobalt oxide, whether as the single catalytic metal or whether in admixture with other reduced metal oxides such as those discussed above. The advantages of the process of the invention employing my novel sodium-promoted catalysts, lie in an increased production of nitrogen-containing products based upon olefin feed and olefin consumed. The sodium-promoted catalysts employed in my process have a long effective catalyst life, and when used, give relatively little production of secondary waste products. Sodium-promoted catalysts are capable of reactivation by hydrogen as described in my application Serial No. 558,487, now U. S. Patent No. 2,437,487, and as described in Olson application Serial No. 691,390, filed August 17, 1946. They are also capable of oxidative regeneration as described in Getty application Serial No. 691,389, filed August 17, 1946, and since abandoned.

The invention will be illustrated by the following example, showing the effect of the inclusion of increasing amounts of sodium in a catalyst of the type described in my application Serial No. 605,832.

Example 87.2 pounds of Celite No. 337 (diatomaceous earth), passing a 200 mesh screen, were mixed with 80 gallons of a sodium carbonate solution containing 160 pounds of anhydrous sodium carbonate. The slurry was settled overnight and then heated to 90° C. with live steam. To it was added 80 gallons of a solution containing the equivalent of 185 pounds of anhydrous cobalt sulfate (70 pounds of cobalt as metal) over a period of ½ hour with intermittent high-speed agitation. The mixture was then agitated for 12 minutes and then pumped to the filter press. The cake in the filter press was washed with water, removed, re-slurried, and again pumped to the press. This washing procedure was repeated until a total of five pressings had been made. All washing was carried out with demineralized water. The wet cake was divided into proportions to permit adjustment of the sodium content of the final catalyst. To accomplish this, the cake was mixed with enough water to obtain a thick paste, and the calculated amount of a suitable sodium compound, in some instances, sodium acetate, and in others caustic soda, added to give the desired sodium content in the final catalyst. After the thorough admixture of the sodium compound with the pasty mass, the mixture in each case was air dried, and then dried in a steam chest. The dried material was then ground and screened through a 28 mesh screen. It was then calcined in a muffle furnace for two hours at 660° F., mixed with 4% of graphite, pelleted as ¼ inch pellets, reground to 28–50 mesh, and repelleted as ⅛ inch pellets. The catalysts were then reduced in the reaction chamber by passing hydrogen through the catalyst mass at a temperature of about 640° F. and at 1500 pounds pressure for five hours, after which the vessel was purged with ammonia at 3000 pounds pressure.

In each case, the temperature of the operation was 640° F., the onstream period six hours, the operating pressure 1500 pounds, the feed a typical PP fraction containing about 40% propylene, the ratio of ammonia to olefin approximately 10:1, the amount of water in the ammonia feed .2 weight percent, and the olefin space velocity in most cases about .14 but in others around .2 and even higher.

The catalyst, as produced, without the addition of a sodium salt, after calcining, contained 0.48% sodium. To successive portions of the catalyst quantities of sodium acetate or caustic soda sufficient to raise the sodium content of the catalyst to 0.55, 0.77, 0.99, 1.30, 1.82, 2.96 and 3.93 were added. The unadjusted catalyst was found, in a number of runs under conditions similar to those given in the table to give an average yield of 14.2%. The relative activities of the catalysts, as determined by the percentage of nitrogen-containing products, calculated as propionitrile, based on the olefin feed, together with the essential operating data, are shown in the following table:

Table

| Sodium comp. added | Acet. | Acet. | Acet. | Acet. | Acet. | NaOH | NaOH |
|---|---|---|---|---|---|---|---|
| Sodium content | 0.55 | 0.77 | 0.99 | 1.30 | 1.82 | 2.96 | 3.93 |
| Temp., °F | 640 | 640 | 640 | 640 | 640 | 640 | 640 |
| Press. #/sq. in | 1,500 | 1,500 | 1,500 | 1,500 | 1,500 | 1,500 | 1,500 |
| S. V. olefin Liq. vol./vol. cat./hr | .14 | .138 | .20 | .26 | .21 | .174 | .19 |
| Wt. percent olefin in HC feed | 40 | 40 | 40 | 41.2 | 39.2 | 39.5 | 39.5 |
| $NH_3$:olefin ratio | 12.1 | 11.2 | 12.3 | 8.75 | 10.8 | 11.3 | 11.1 |
| Wt. percent $H_2O$ in $NH_3$ | 0.2 | 0.2 | 0.2 | 0.2 | 0.2 | 0.2 | 0.2 |
| Yield, percent | 13.8 | 11.2 | 11.5 | 23.6 | 20.4 | 36.3 | 34.5 |

Another series of tests were carried out to determine the effect of sodium on a nickel-cobalt catalyst. In these tests the catalyst was prepared by adding to the sodium carbonate slurry of a Celite No. 337 a solution containing cobalt sulfate and nickel sulfate in the stoichiometrical proportions of 2:1, specifically by the addition of a solution of cobalt heptahydrate ($CoSO_4.7H_2O$) and nickel hexahydrate ($NiSO_4.6H_2O$) containing 1275 grams of the cobalt salt and 597 grams of a nickel salt per gallon to a slurry containing 540 grams of the Celite and 910 grams of sodium carbonate per gallon. The catalyst, with no sodium adjustment, contained 0.29 percent sodium. Two other lots were prepared containing 1.10 and 1.95 percent of sodium, respectively. These catalysts were calcined and reduced as described above and then tested for activity in the amination reaction. The conditions of the operation were substantially the same as those given for the tests on the sodium-adjusted cobalt catalyst above. The yields of nitrogen-containing products obtained, calculated as propionitrile, were 17.6 percent, 24 percent, and 26 percent, respectively, illustrating the marked increase in activity with the mixed cobalt-nickel catalyst when a sodium content is increased above about 1 percent.

Other amination catalysts, including other modified cobalt-containing catalysts, such as catalysts containing cobalt along with copper, iron, manganese, thorium, or other metals, similarly show an increase in activity with increased sodium content.

I claim:

1. A process for producing nitriles and amines by the direct reaction of ammonia with olefins which comprises bringing a mixture containing ammonia and olefin, the ammonia being present in substantial excess, at a reaction temperature within the range 400°–700° F. and at a pressure approximating 1500 pounds per square inch into contact with a catalyst effective for the production of nitriles and amines by the direct reaction of ammonia with olefins, said catalyst consisting of a catalytically effective reduced metal oxide including as an essential component an oxide of a metal selected from the group consisting of cobalt and nickel deposited on an inert carrier and containing in excess of 1% of sodium.

2. A process for producing nitriles and amines by the direct reaction of ammonia with olefins as defined in claim 1 in which the sodium content of the catalyst is in excess of 1.25%.

3. A process for producing nitriles and amines by the direct reaction of ammonia with olefins as defined in claim 1 in which the catalyst contains catalytically effective reduced cobalt oxide.

JOHN W. TETER.

REFERENCES CITED

The following references are of record in the file of this patent:

UNITED STATES PATENTS

| Number | Name | Date |
|---|---|---|
| 1,555,505 | Larson | Sept. 29, 1925 |
| 1,920,795 | Jaeger | Aug. 1, 1933 |
| 2,004,135 | Rothrock | June 11, 1935 |
| 2,206,377 | Weiss | July 2, 1940 |
| 2,331,968 | Forney | Oct. 19, 1943 |
| 2,381,709 | Apgar et al. | Aug. 7, 1945 |
| 2,417,892 | Teter | Mar. 25, 1947 |
| 2,417,893 | Teter | Mar. 25, 1947 |
| 2,418,562 | Teter | Apr. 8, 1947 |

OTHER REFERENCES

Berkmann et al., "Catalysis" (Reinhold Pub. Co. 1940), p. 874.